July 29, 1941.  J. SANDUSKY  2,250,817
ELECTROLYTE LEVEL CONTROL DEVICE FOR STORAGE BATTERIES
Filed May 27, 1940
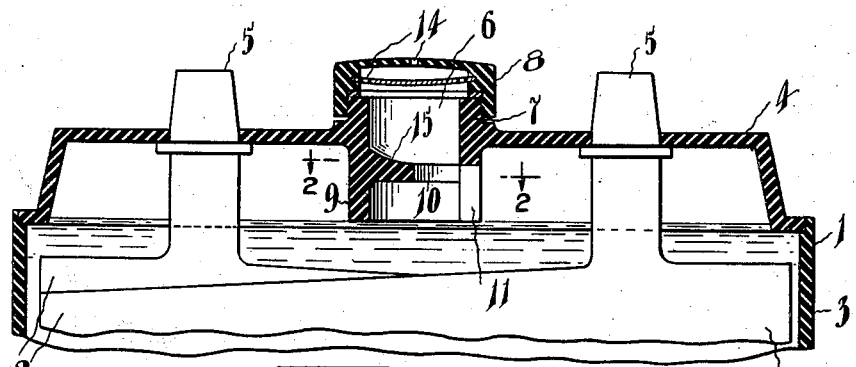
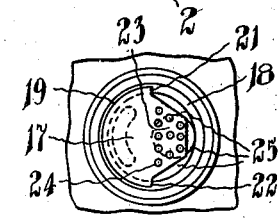
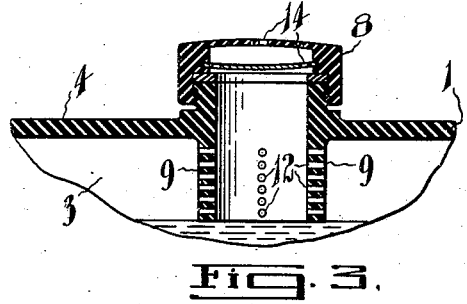
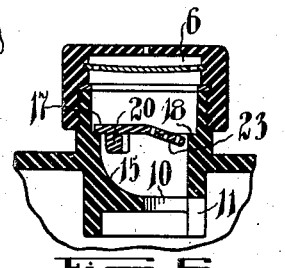
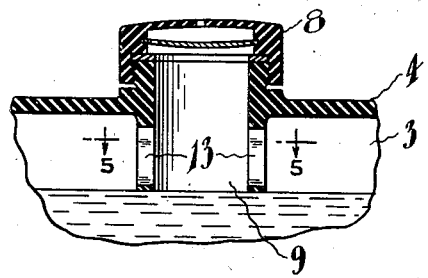
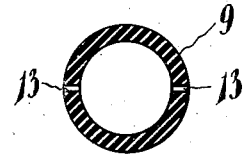
Inventor
J. Sandusky
by J. Edw. Maybee
ATTY.

Patented July 29, 1941

2,250,817

UNITED STATES PATENT OFFICE 2,250,817

ELECTROLYTE LEVEL CONTROL DEVICE FOR STORAGE BATTERIES

Julius Sandusky, Toronto Township, Peel County, Ontario, Canada

Application May 27, 1940, Serial No. 337,437

7 Claims. (Cl. 136—177)

The object of this invention is to provide a device which will prevent the overfilling of battery cells when fresh liquid is being added.

The object is attained by means of the construction which may be briefly described as follows: The battery cell is of the usual plate type which is totally enclosed and has a filler opening in the top thereof for the purpose of adding fresh liquid to the cell. Over this filler opening is screwed a filler cap which has a hole formed therein for the purpose of ventilating the cell. Extending downwardly from the filler opening is a filling tube which extends into the battery cell to the correct level of the electrolyte above the plates. Formed in this filling tube is a vent consisting of one or more openings for the purpose of forming a communication between the air space in the top of the battery cell and the atmosphere when the lower end of the filling tube is immersed in the electrolyte. The vent is of such small dimensions so that if the liquid which is being added to the battery flows over the vent it seals the vent and when the liquid rises to the bottom of the filling tube there is no communication between the atmosphere and the air space in the top of the cell. The liquid will then rise in the filling tube indicating the cell is filled to the correct level. A slight jarring of the battery will cause the seal in the vent to break and the liquid will drop in the tube to the same level as the liquid in the cell. The vent then forms the only communication between the air space at the top of the cell and the atmosphere since the end of the tube is under the liquid. While the vent is of such small dimensions that a film of liquid tends to form over it and seal it, it is so constructed that the total area of the opening formed by the vent is comparatively large to provide for the passage of gas normally generated by the charging of the battery. To provide such comparatively large area the vent is composed of a plurality of openings or a single long narrow opening. A baffle is provided to direct the liquid against the vent when the battery is being filled.

The invention is hereinafter more fully described and is illustrated in the accompanying drawing in which Figure 1 is a vertical section of the top of a cell of a battery constructed in accordance with my invention;

Figure 2 a section on the line 2—2 in Figure 1;

Figure 3 a vertical section of a modification of my invention;

Figure 4 a similar view of another modification;

Figure 5 a section on line 5—5 in Figure 4;

Figure 6 a vertical section of still another modification of my invention; and

Figure 7 a plan view of the invention as shown in Figure 6 with the cap removed.

In the drawing like numerals of reference indicate the corresponding parts in the different figures.

The cell 1 is of the usual type as used in storage batteries having plates 2, a container 3 and top 4. Extending through the top 4 are terminals 5.

Referring to Figures 1 and 2, the filler opening 6 has an outwardly extending boss 7 which has formed thereon an external thread on which is screwed the filler cap 8 having vents 14.

Extending inwardly from the boss 7 is the filling tube 9 in which is formed an offset opening 10 at its lower end. The offsetting of the opening 10 forms a shoulder or baffle 15.

Formed in the filling tube 9 at the nearest side of the offset opening is a slot 11 of a width so small relative to the length of the slot and thickness of the tube that when water flows down the inside of the tube and over the slot a film tends to form over the slot and seal it. This slot may extend the full length of the tube 9 or may be formed in the tube intermediate the top and bottom. The length of the tube 9 depends upon the depth of electrolyte required above the top of the plates 2. The space between the top of the plates 2 and the end of the tube 9 controls the level of the electrolyte in the cell.

The operation is as follows. To fill the cell of the battery, the cap 8 is removed so that the liquid to be added can be poured through the filler opening 6 and passes through the tube 9 and the offset hole 10. Some of the liquid passing through the opening 6 and down the tube 9 contacts the shoulder formed by the offsetting of the hole 10 and splashes against the slot 11 and forms a seal therein. This closes any communication between the air space at the top of the cell and the filling tube. As the liquid is continued to be poured into the cell, the level will gradually rise until it reaches the bottom of the tube 9. Since the slot 11 is closed by a film of liquid there is no passage of air between the top of the cell and the filling tube. The liquid will then rise in the filling tube to the filler opening indicating that the liquid in the battery has reached the proper level.

It appears that the surface tension of the liquid in the slot 11 is sufficient to prevent the air being forced through the slot by the head of the liquid in the filling tube 9.

Jarring the battery, such as would happen in the normal use in an automobile, will cause the seal in the slot 11 to break and permit the passage of air therethrough causing the liquid in the filling tube 9 to drop to the same level as the liquid in the rest of the cell. The seal in the slot 11 having been broken, the slot then acts as a vent to allow any gases formed in the cell to escape.

In Figure 3 is shown a modified construction of my filling device in which the tube 9 has holes 12 of small dimensions formed therein in place of the slot 11. The sealing of these holes 12 is effected by pouring the liquid over them when the battery is being filled.

Figures 4 and 5 show a still further modification of my invention. Instead of the holes 12 formed in the tube 9 rectangular openings 13 of small dimensions are formed therein. The seal, in this case, is also formed in the openings 13 by pouring the liquid over them when the battery is being filled as in the modification shown in Figure 3.

The purpose of forming the vent as a slot or a plurality of openings is to provide a vent of large area compared to the width of the opening or openings in order to provide for the escape of gases normally generated when the battery is charged.

Figures 6 and 7 show still another modification of my invention. In this modification in addition to the shoulder or baffle 15 formed by the offsetting of the hole 10, there is also shown a rockable baffle 17. The invention can be used with either type of baffle and it is not necessary to use both.

Formed in the filler opening 6 is a shoulder 18 on which rests the baffle 17. This baffle has a semicircular part 19 which rests on the shoulder 18. Formed integral with the part 19 is a counter balance weight 20. From substantially the center of the baffle the baffle is bent slightly downwardly towards the vent and has shoulders 21 and 22 formed thereon to form pivots engaging the shoulder 18 on which the baffle rocks.

The downwardly sloping part 23 has holes 24 therein and is cut so as to have spaces 25 between the filler opening 6 and the baffle.

When filling the battery the downwardly sloping part 23 causes the liquid to flow down over the vent 11 to form a seal.

The baffle is made rockable to allow the passage of a hydrometer through the hole 10 into the electrolyte when testing the battery.

I have found by practical experience, if the vent is in the form of a slot, that a tube of $\frac{3}{32}$ of an inch in thickness the width of the slot should be about $\frac{1}{32}$ of an inch. If the end of the slot is closed the width of the slot can be increased to $\frac{1}{8}$ of an inch and still give good results.

I have also found if the vent is in the form of holes the best results are obtained from holes of $\frac{3}{64}$ of an inch diameter in a tube of $\frac{3}{32}$ of an inch in thickness. However, good results may be obtained from holes of a diameter of $\frac{1}{8}$ of an inch.

What I claim as my invention is:

1. In an electrolytic level control device for storage batteries, a cell having a filling opening therein; a filling tube extending downwardly from said opening into said cell; a vent extending through the side of said tube forming a communication between the interior of said tube and the air space within the top of said cell, said vent being of such dimensions that water flowing over it tends to form a seal; and a baffle in said tube adapted to direct water passing through said tube over the vent.

2. In an electrolytic level control device for storage batteries, a cell having a filling opening therein; a filling tube extending downwardly from said opening into said cell; a vent extending through the side of said tube forming a communication between the interior of said tube and the air space within the top of said cell, said vent being of such small width that water flowing over it tends to form a seal, but of comparatively large area; and a baffle in said tube adapted to direct water passing through the said tube over the vent.

3. In an electrolytic level control device for storage batteries, a cell having a filling opening therein; a filling tube extending downwardly from said opening into said cell; a slot extending through and longitudinally of said tube forming a communication between the interior of said tube and the air space within the top of said cell, said slot being open at its lower end and of such width that water flowing over it tends to form a seal; and a baffle in said tube adapted to direct water passing through the said tube over the slot.

4. In an electrolytic level control device for storage batteries, a cell having a filling opening therein; a filling tube extending downwardly from said opening into said cell; a vent extending through the side of said tube forming a communication between the interior of said tube and the air space within the top of said cell, said vent being of such dimensions that water flowing over it tends to form a seal; and a baffle in said tube located substantially opposite the vent to direct water passing through said tube against the vent.

5. In an electrolytic level control device for storage batteries, a cell having a filling opening therein; a filling tube extending downwardly from said opening into said cell; a vent extending through the side of said tube forming a communication between the interior of said tube and the air space within the top of said cell, said vent being of such small width that water flowing over it tends to form a seal, but of comparatively large area; and a baffle in said tube located substantially opposite the vent to direct water passing through the said tube against the vent.

6. In an electrolytic level control device for storage batteries, a cell having a filling opening therein; a filling tube extending downwardly from said opening into said cell; a slot extending through and longitudinally of said tube forming a communication between the interior of said tube and the air space within the top of said cell, said slot being open at its lower end and of such width that water flowing over it tends to form a seal; and a baffle in said tube located substantially opposite the slot to direct water passing through the said tube against the vent.

7. A device as claimed in claim 4 in which the baffle is rockable to permit the passage of a hydrometer.

JULIUS SANDUSKY.